(12) United States Patent
Riehl et al.

(10) Patent No.: US 11,328,531 B2
(45) Date of Patent: *May 10, 2022

(54) APPARATUS FOR OPTICALLY DIRECTLY RECORDING SKIN PRINTS FOR MOBILE APPLICATIONS

(71) Applicant: JENETRIC GmbH, Jena (DE)

(72) Inventors: Philipp Riehl, Jena (DE); Holger Femel, Rothenstein (DE); Undine Richter, Jena (DE); Joerg Reinhold, Jena (DE)

(73) Assignee: JENETRIC GMBH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/278,274

(22) PCT Filed: Sep. 17, 2019

(86) PCT No.: PCT/DE2019/100820
§ 371 (c)(1),
(2) Date: Mar. 19, 2021

(87) PCT Pub. No.: WO2020/057696
PCT Pub. Date: Mar. 26, 2020

(65) Prior Publication Data
US 2021/0271845 A1    Sep. 2, 2021

(30) Foreign Application Priority Data

Sep. 19, 2018  (DE) .................... 10 2018 122 918.6

(51) Int. Cl.
*G06V 40/13* (2022.01)
*F21V 8/00* (2006.01)
(Continued)

(52) U.S. Cl.
CPC ......... *G06V 40/1318* (2022.01); *G02B 6/003* (2013.01); *G02B 6/0036* (2013.01); *G06V 40/67* (2022.01); *H04N 1/0281* (2013.01)

(58) Field of Classification Search
CPC .. G06K 9/00; G06K 9/00006; G06K 9/00013; G06K 9/0002; G06K 9/00026;
(Continued)

(56) References Cited

U.S. PATENT DOCUMENTS 5,177,802 A * 1/1993 Fujimoto ............. A61B 5/1172
382/124
5,986,746 A * 11/1999 Metz ................... G06K 7/10663
356/71

(Continued)

FOREIGN PATENT DOCUMENTS

DE    102015115484 B3    1/2017
KR    10-2018-0018883 A    2/2018
(Continued)

OTHER PUBLICATIONS

International Search Report from PCT/DE2019/100820, filed Sep. 17, 2019, dated Nov. 28, 2019.

*Primary Examiner* — Nathnael Aynalem
(74) *Attorney, Agent, or Firm* — Patentbar International PC

(57) ABSTRACT

An apparatus for direct optical recording of skin prints has a display below the placement surface and a light guide layer below the display. The light guide layer has light in-coupling at a narrow side and light out-coupling structures in the surface. By means of angles ε of the light out-coupling structures and differences in the refractive indices of the neighboring layers, a directed coupling out of light occurs in the direction of the placement surface causing a total internal reflection at the placement surface. The display has a transparency of at least 1% of the coupled out light. A first and
(Continued)

second adhesion layers are between the display and the light guide layer and between the light guide layer and the sensor layer. The refractive indices of the adhesion layers are at least 1% to 30% lower than those of light guide layer, the display and the sensor layer.

18 Claims, 9 Drawing Sheets

(51) Int. Cl.
*H04N 1/028* (2006.01)
*G06V 40/60* (2022.01)

(58) Field of Classification Search
CPC ............. G06K 9/00033; G06K 9/0004; G06K 9/00046; G06K 9/00053; G06K 2009/0006; G06K 9/00087; G06K 9/00093; G06K 9/001; G06K 9/00912; G02B 6/003; G02B 6/0036
USPC ......................................................... 382/124
See application file for complete search history.

(56) References Cited

U.S. PATENT DOCUMENTS

| | | |
|---|---|---|
| 10,607,056 B2 * | 3/2020 | Hillmann ............. G06K 9/2027 |
| 2004/0179722 A1 * | 9/2004 | Moritoki ............. G02B 6/4274 |
| | | 382/124 |
| 2012/0328170 A1 | 12/2012 | Wu et al. |
| 2013/0120760 A1 * | 5/2013 | Raguin ................ G06K 9/0004 |
| | | 356/612 |
| 2017/0085813 A1 | 3/2017 | Reinhold et al. |
| 2017/0323144 A1 * | 11/2017 | Wu .................... G06K 9/00046 |
| 2017/0351901 A1 | 12/2017 | Kim et al. |
| 2018/0005005 A1 | 1/2018 | He et al. |
| 2018/0031925 A1 | 2/2018 | Kong et al. |
| 2018/0121701 A1 | 5/2018 | Ling et al. |
| 2018/0128957 A1 | 5/2018 | Davis et al. |
| 2018/0165497 A1 | 6/2018 | Lee et al. |

FOREIGN PATENT DOCUMENTS

| | | | |
|---|---|---|---|
| TW | M558941 U | 4/2018 | |
| WO | WO-2017118029 A1 * | 7/2017 | ............... G06K 9/00 |

* cited by examiner

APPARATUS FOR OPTICALLY DIRECTLY RECORDING SKIN PRINTS FOR MOBILE APPLICATIONS

RELATED APPLICATIONS

This application is a U.S. National Stage Under 35 USC § 371 of International Application PCT/DE2019/100820, filed on Sep. 17, 2019, which in turn claims priority to German Patent Application DE 10 2018 122 918.6, filed Sep. 19, 2018, both of which are incorporated herein by reference in their entirety.

FIELD OF THE INVENTION

The invention is directed to an apparatus for direct optical recording of skin prints for mobile applications, particularly for the recording of papillary lines of multiple-finger prints or handprints by means of mobile electronic devices such as tablet PCs, mobile telephones (smartphones), etc.

BACKGROUND OF THE INVENTION

On the one hand, there are systems which are used for the verification of biometric features in which there must be a match with stored features in order, for example, to allow access control for certain restricted areas.

Other systems are used for identification by matching with comparison databases, for example, issuance of passports and visas, verification of personal identity at border controls, particularly at airports, or for police records identification. The requirements respecting quality, resolution and fidelity to the original of the recorded images of skin prints are very extensive in the latter systems.

Thanks in no small part to high requirements of organizations tasked with identification measures such as the Federal Bureau of Investigation (FBI), for example, there is a high degree of standardization in these systems in order to ensure the highest possible certainty of identification on the one hand, and, on the other hand, to allow comparison between datasets which have been recorded with a variety of systems.

A high-quality system design is needed to meet these requirement criteria. In an optical system, this means, for example, that requirements must be met not only by the recording sensor, or recording sensors, but also by the illumination and all of the other components required for imaging, especially when large skin surfaces, i.e., more than one finger (for example, an entire hand), are to be recorded simultaneously.

Currently, various systems are used for acquiring fingerprints and handprints which satisfy the above-mentioned high requirements with respect to quality.

On the one hand, capacitive semitransparent TFT sensors are used in which user guidance can be realized by means of a display below the sensor. However, it is not possible to read security-relevant objects, e.g., passports, driver's licenses, tickets, boarding passes, etc., so that a separate device or at least an additional optical sensor layer would be necessary. However, this would drive up equipment costs.

On the other hand, arrangements which realize direct optical scanning of skin prints and combine the advantages of visual user guidance below the placement surface with an optical recording of documents through the use of optical semitransparent TFT sensors are surging into the market. Systems in which a display is positioned below the optical sensor for this purpose are already known from DE 10 2015 115 484 B3. When the display simultaneously functions as illumination or when backlighting is used, the overlying object is illuminated diffusely, i.e., nondirectionally. The light backscattered from the object is subsequently detected by the light-sensitive elements of the sensor. The thickness of the terminating layer between the placement surface and the light-sensitive elements is limited to a few micrometers because resolution and contrast decrease rapidly as the distance between sensor and placement surface increases.

However, various solutions are also known which allow or require a greater thickness of the terminating layer while retaining the same image quality.

To this end, on the one hand, the illumination light of the backlighting can be collimated as is known in various arrangements from US 2018/0121701 A1 (WO 2017/118030 A1). However, it has proven disadvantageous that additional optical elements must be integrated between the illumination and the placement surface in order to realize the required light shaping. This additional layer increases the thickness of the apparatus overall, is expensive and production thereof is complex.

Similarly, it is known from US 2018/0165497 A1 that an optical image sensor which can comprise a fingerprint sensor is embedded in a flat panel display. The construction comprises a display screen with a display area and a non-display area and a light-directing device which corresponds in length and width with the display screen and abuts the display screen and is formed of two cover plates connected to a low-refracting adhesive layer. The light is coupled in outside of the display layer of the flat panel screen, and a light bundle is coupled into the bottom cover plate through a light-refracting layer below the display layer at an angle of between 70° and 75° and further conducted in this bottom cover plate so as to undergo total reflection. A portion of this totally reflected light is coupled into the top cover plate at the light-refracting layer at a smaller angle and is thrown back in direction of the display at the outer air boundary based on the principle of total internal reflection (TIR), and it can transmit through the low-refracting layer and can also pass the bottom cover plate without reflection. Since the display is an AMOLED (active matrix organic light-emitting diode), it can also be used as a sensor layer. Fingerprints can be detected in this way. By using IR light, veins can also be detected.

A disadvantage consists in the pointwise lateral coupling in of light via a diffraction grating, which requires a laser source in order to couple the necessary light intensities into a light guide. Accordingly, the illumination in the light guide is carried out only within a triangular surface area and is subject to the known exponential decrease in strength with increasing distance from the source point. Further, the coupling out of light from the light guide via the usual scattering centers as is described, for example, in US 2018/0128957 A1 (Corning Incorporated) as illumination for high-quality recording of fingerprints which satisfies FBI standards is limited in that the proportion of illumination rays is rather small for the TIR principle. Moreover, it proves disadvantageous that the light guide is arranged above the display because this reduces the image quality or display quality of the display, since it lies in a lower plane and is accordingly farther away from the display surface. Beyond this, a light guide also always has a haze due to the scattering centers for the light out-coupling so that the quality of the display reproductions is further reduced.

SUMMARY OF THE INVENTION

It is the object of the invention to find a novel possibility for direct optical recording of skin prints of human autopodia in an electronic mobile device which is oriented to the high requirements for personal identification in accordance with FBI standards and which permits a display layer for displaying pictures or videos and for user guidance directly below the placement surface particularly without a decrease in the spatial resolution of the fingerprints.

In an apparatus for direct optical recording of skin prints with a layer body which comprises a placement surface formed by a terminating layer of the layer body and a combination of a display and a sensor layer, wherein the sensor layer has light-sensitive elements arranged in a sensor grid, the above-stated object is met according to the invention in that a light source unit is arranged below the display, wherein the light source unit is formed as light guide layer and has a coupling in of light by means of LEDs at a narrow side, in that the light guide layer has light out-coupling structures which, on the basis of an inclination angle of the light out-coupling structures and on the basis of differences in the refractive indices between the neighboring layers of the light guide layer, permit a directed coupling out of light from the light guide layer in direction of the terminating layer at a defined angle which, after passing through all of the layers up to the terminating layer, results in total internal reflection (TIR) at the placement surface at the air interface and with a small divergence angle range of $\leq \pm 15°$ in order to achieve a high spatial resolution of the skin print to be recorded, in that the display has a defined transparency of at least 1% of the light coupled out of the light guide layer in direction of the placement surface, in that there is a first adhesion layer between the display and the light guide layer and a second adhesion layer between the light guide layer and the sensor layer, wherein the first adhesion layer and the second adhesion layer have a refractive index of the same magnitude which is at least 1% to 30% lower than the refractive indices of the light guide layer, of the display and of the sensor layer, the refractive index thereof being between 1.45 and 2.0.

The LED light in-coupling advantageously has precollimation optics at the narrow side of the light guide layer, which precollimation optics are arranged downstream of the LEDs and with which a horizontal divergence between 2.5° and 30° is adjusted in a beam coupled into the light guide layer in each instance in order to achieve an improved resolution of the skin print to be recorded. The precollimation optics are advisably a refractive optical element, preferably a convex lens or GRIN lens incorporated at the narrow side of the light guide layer or formed inside of the light guide layer in the form of a concave lens from a medium with a lower refractive index compared to the light guide layer.

In a preferred configuration, a plurality of closely adjacent LEDs with precollimation optics are arranged along a narrow side of the light guide layer such that there are readout regions on the placement surface in which the beams of the LEDs overlap neither in horizontal direction nor in vertical direction and in which skin prints can be recorded with high spatial resolution, and further, there are intermediate regions in which there is no information about skin prints. In this regard, an authentication region of the placement surface advantageously has a high density of readout regions with a percentage of >50% and is configured for virtually gapless recordings of skin prints with high spatial resolution for authentication applications (home button). Further, another region of the placement surface advisably has a low density of readout regions with a percentage of intermediate regions of >50% and is therefore configured for recording skin prints with gaps with high spatial (vertical and horizontal) resolution for low security-relevant applications and the capture of finger gestures.

In a further advantageous construction, a corner light in-coupling with at least one LED is arranged at a narrow side which is provided by cutting at least one corner of the light guide layer, and a drop in intensity of the divergent beam coupled into the light guide layer is compensated by an increasing fill factor of the light out-coupling structures. A diffuser is advantageously arranged between LED and light guide layer for uniform distribution of the coupled-in light in all solid angles so that the light out-coupling structures need not compensate for a decrease in light at the edge areas of the light guide layer adjacent to the cut corner.

In another advantageous configuration, there is arranged under the transparent light guide layer a further light guide layer which is connected to the transparent light guide layer above it by a further adhesion layer through a refractive index which is selected low like in the first adhesion layer and second adhesion layer.

The light guide layer and the further light guide layer advisably have a light in-coupling on opposite narrow sides of the layer body. This is important for falling back on the further light guide layer in case the skin print which was exposed with the previously used light guide layer is too poor (defect gaps, pixels, wet fingers, dry fingers, etc.). Accordingly, a second image can be recorded which is offset with respect to the first image and which was possibly also recorded with different wavelengths/angles. In so doing, the further light guide layer advisably couples out in the same manner in direction of the placement surface. This is important for the efficiency of the system and, above all, for ToS mobile, since the transparency of the OLEDs is so low. The two light guide layers are operated in a quasi-parallel manner but the light is coupled out at different locations: region 1 and region 2. Accordingly, higher light intensities are possible for the illumination of the overlying object. Further light guides with corresponding LED arrays for the illumination of determined regions are possible.

On the other hand, it is also advisable that the light guide layer and the further light guide layer have the light out-coupling structures in regions of the light guide layers that are horizontally offset relative to one another so as to increase the efficiency of the light out-coupling with good homogeneity at the same time.

In a particularly preferred configuration, the light-sensitive elements which are arranged in a defined grid and incorporated inside the display in a luminous element layer are provided in the partially transparent display.

In a first variant, a method for direct optical recording of skin prints using an apparatus according to claim 12 with a layer body which comprises a placement surface and a combination of a display and a sensor layer, which placement surface is formed by a terminating layer of the layer body, wherein the sensor layer has light-sensitive elements arranged in a sensor grid, the layer body having a light source below the display, which light source comprises a light guide layer which is coupled with an adhesion layer and below which is mounted a further light guide layer, the light guide layer being connected to the further light guide layer through a further adhesion layer with a refractive index which is selected low as in the first adhesion layer, has the following steps:

switching off the display during the recording at least in the region of the placed skin prints in order to increase the relative proportion of directed illumination light of the light guide layer compared with an undirected light emission of the display, recording a first image with illumination by the light guide layer and storing it in an image storage, analyzing the first image for determining whether or not defined quality criteria are met, recording a second image with illumination by the further light guide layer when quality criteria are not met in the first image, analyzing the second image for determining whether or not quality criteria are met, where when the quality criteria are met in the second image, the first image in the image storage is replaced with the second image, or when the quality criteria are not met in the second image, the stored first image is superposed on the second image with a defined known offset, and a high-resolution fused image is stored.

However, when the quality criteria are met in the first image there is also the possibility of recording the second image in order to either improve the image quality by combining the two images, or to achieve a higher resolution than is actually possessed by the sensor layer for very high-quality recordings by combining the two images while taking into account a definedly adjusted offset by one half of the spacing of the light sensitive elements of the sensor layer.

A plurality of light guide layers with different inclination angles of the light out-coupling structures are also conceivable for adjusting the defined offset.

In another variant, a method for direct optical recording of skin prints and documents using an apparatus according to claim 12 having a layer body which comprises a placement surface and a combination of a display and a sensor layer, which placement surface is formed by a terminating layer of the layer body, wherein the sensor layer has light-sensitive elements arranged in a sensor grid, the layer body having a light source below the display, which light source comprises a light guide layer which is coupled with a first adhesion layer and below which a further light guide layer is connected by a second adhesion layer, wherein the second adhesion layer has a refractive index which is selected low like the first adhesion layer, has the following steps:

switching off the display during the recording of a first image at least in the region of the placed skin prints in order to increase the relative proportion of directed illumination light of the light guide layer compared with an undirected light emission of the display, recording the first image by illumination with light at an illumination angle β which is suitable for TIR in the terminating layer of the display and which results from the light guide layer coupling out at the diffraction angle γ, and storing the first image in an image storage as image of the placed skin print, recording a second image by illumination with the display for recording the document, and storing the second image as image of the placed document.

The invention is based on the fundamental consideration that when the functions of fingerprint recording and display functions for user guidance in the placement surface are combined in one device which, moreover, should also possibly implement document recording, the light intensity of the skin prints generally becomes insufficient, the display quality of the display layer decreases, or the resolution and the contrast of the recordings no longer meet the aimed-for FBI standard. This is aggravated by the fact that a display located on top results in that the skin print to be recorded is substantially distant from the sensor layer, which causes a further decrease in contrast and resolution. The invention solves these problems in that a light guide layer is arranged under the display, and the coupling in of light is carried out at a narrow side of the light guide layer by means of LEDs, and the light guide layer is provided with light out-coupling structures which, based on the inclination angle of the light out-coupling structures and based on the differences in refractive indices between the neighboring layers of the light guide layer up to the placement surface at the upper side of the display, permit a directed out-coupling of light at a defined angle which leads to TIR at the placement surface at the air interface with a small divergence angle range of $\leq\pm15°$ in order to achieve a high spatial resolution of the skin print to be recorded.

The out-coupling of light can be further improved selectively by refractive indices of the adhesion layers and neighboring layers, which refractive indices are adapted to the light guide layer. Beyond this, the applications of an additional diaphragm layer and electronic shutter controls for each sensor element of the sensor layer allow a further improvement in the quality of skin prints. Moreover, it is possible to record documents with illumination by the display.

The invention makes it possible to record skin prints of human autopodia by means of a mobile electronic device with a high quality oriented to the FBI standard and, further, to display information for, inter alia, user guidance by means of a display under the placement surface and above the sensor plane without resulting in a deterioration of the spatial resolution of the skin print images.

BRIEF DESCRIPTION OF THE DRAWINGS

The invention will be described more fully in the following with reference to embodiment examples. The drawings show.

DETAILED DESCRIPTION OF THE PREFERRED EMBODIMENTS

Figure 1:
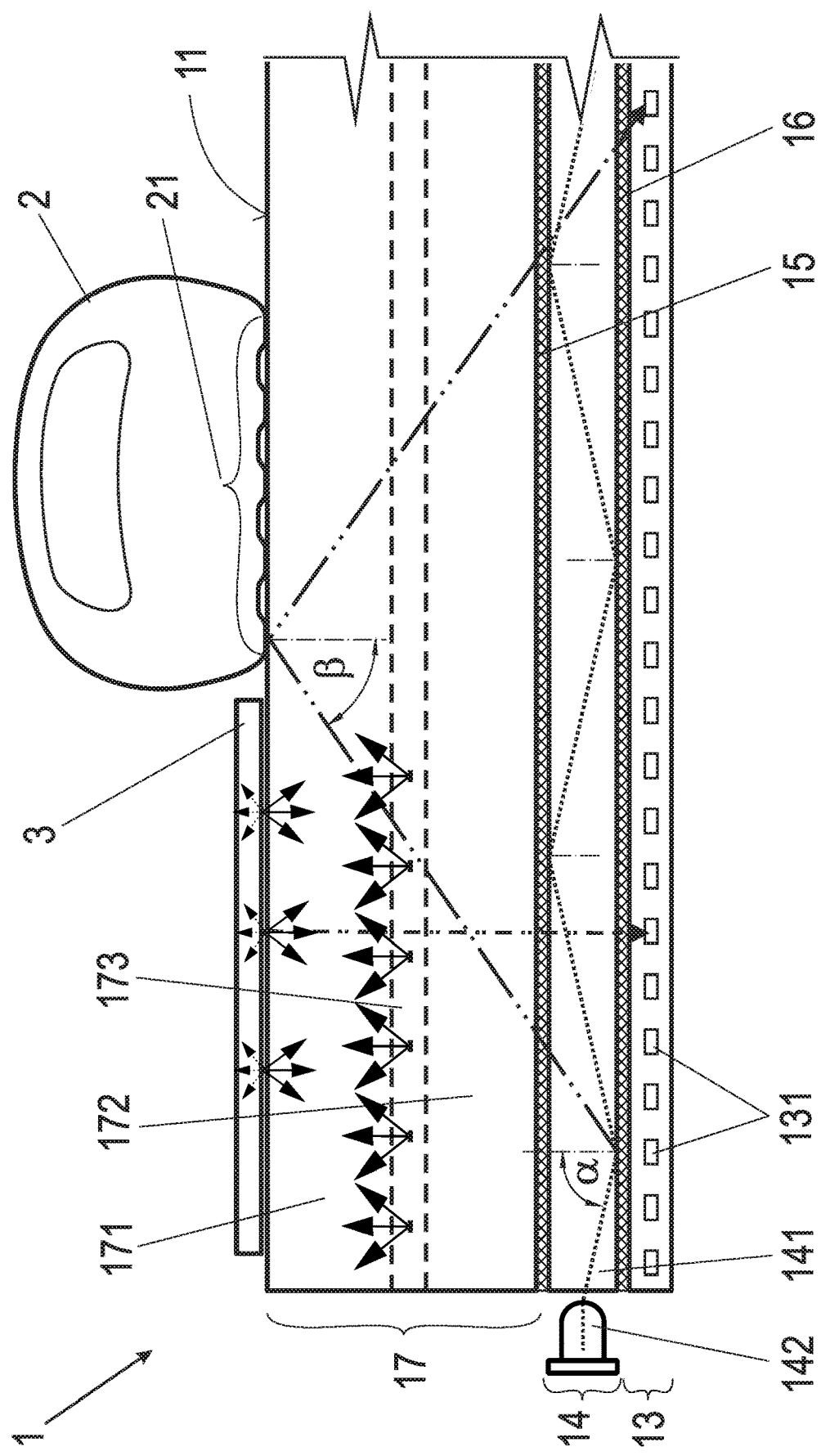
FIG. 1 shows a basic construction of the apparatus according to the invention with a layer body comprising a display with placement surface for objects to be recorded, a light guide layer as light source, and a sensor layer.

In a basic construction, as is shown in FIG. 1, the apparatus according to the invention comprises a layer body 1 which, starting from a placement surface 11 for the objects to be recorded (finger 2 or document 3), comprises a display 17, a planar light source unit 14 under the latter which is formed as a light guide layer 141 at which one or more LEDs 142 are mounted on at least at one narrow side as light sources for coupling in light which has been precollimated to a greater or lesser extent and, located below the latter, a sensor layer 13 with light-sensitive sensor elements 131. A first adhesion layer 15 is arranged, preferably as adhesive layer, between the display 17 of layer body 1 and light guide layer 141, and a second adhesion layer 16 is arranged, preferably in the form of an adhesive layer, between the light guide layer 141 and the sensor layer 13. The first adhesion layer 15 has a refractive index which is at least 1% and at most 30% lower than the refractive index of light guide layer 141, where the refractive index of the light guide layer 141 is between 1.45 and 2.0, and the second adhesion layer 16 has a refractive index which is exactly the same magnitude as that of the first adhesion layer 15.

The display 17 is constructed in a plurality of layers as conventional display element and comprises a terminating layer 171, a substrate 172 and a luminous element layer 173 as actual function layer. With the terminating layer 171, the upper side of the display 17 forms a placement surface 11 for a skin print 21 or document 3 to be recorded. The placement surface 11 is simultaneously formed as interaction surface for the user of an electronic mobile device with integrated apparatus according to the invention. Information in the form of text, pictures or videos can be displayed to the user by means of display 17, and the user can interact with the device via the sensor layer 13 for recording skin prints 21.

The display 17 comprises light-emitting display pixels arranged in grid shape in a luminous element layer 173. The display 17 can be an OELD, LCD or QLED, for example. Additionally, the display 17 can be formed as a touch screen, and the display 17 comprises capacitive or resistive touch sensors (not shown) such as are commonly used in mobile electronic devices. Additionally, the display 17 is transparent to at least some of the illumination light from the light guide layer 141 and has a transparency of at least 1%, preferably 10%. The display can have a thickness of 100 μm to 10,000 μm. The display preferably has a thickness of 500 μm to 2000 μm so as to be sufficiently thin for recording skin prints with good resolution and sufficiently thick for manageable mechanical stability.

A first adhesion layer 15 which is optically transparent and also transparent to at least some of the illumination light from the light guide layer 141 is located below the display 17. This may be a matter of an optically transparent double-sided adhesive tape (OCA) or a liquid adhesive which has been cured, for example, by heat or UV radiation (LOCA). These adhesives can be silicones, acrylates or epoxies, for example.

A light guide layer 141 for illuminating skin prints 21 positioned on the placement surface 11 is located below the first adhesion layer 15. Illumination light is coupled in at a narrow side of the light guide layer 141 by means of LEDs 142. Special light out-coupling structures 144 (shown in FIGS. 2A-2C) are used for coupling illumination light out of the light guide layer 141. These light out-coupling structures 144 ensure that illumination light undergoes a change in angle inside of the light guide layer 141 and is subsequently coupled out of the light guide layer 141 in direction of the display 17 or placement surface 11 in a defined angular spectrum (output angle γ; γ') and illuminates an overlying skin print 21. Polycarbonate (PC), polymethylmethacrylate (PMMA), glass or other optically transparent materials with a refractive index n≈1.5 are utilized as light guide layer 141. However, other materials with a refractive index between 1.45 and 2.0 can also be used as light guide layer 141. The light-guiding effect at the locations on the light guide layer 141 without light out-coupling structures 144 is realized through the difference in refractive indices between light guide layer 141 and first adhesion layer 15 and second adhesion layers 16, the latter producing the connection to the sensor layer 13.

The second adhesion layer 16 has optical characteristics identical to or similar to those of the first adhesion layer 15. The first adhesion layer 15 and second adhesion layer 16 have a lower refractive index than the light guide layer 141 in order to realize a light-guiding effect through total internal reflection (TIR). To this end, the two adhesion layers 15, 16 have a refractive index which is at least 1%, at most 30%, lower than the refractive index of the light guide layer 141. The difference in refractive index is preferably between 5% and 10% in order to be sufficiently efficient and to conduct enough light in the light guide layer 141 on the one hand and, on the other hand, so that the conducted angular spectrum selected is not too large and in order to realize a low vertical divergence of the conducted beams 147 for a good resolution of the skin areas 21 to be recorded.

The sensor layer 13 arranged below the second adhesion layer 16 has light-sensitive elements 131 arranged in a grid with a resolution of 100 ppi to 1000 ppi and, depending on the detected light intensity, passes on electronic signals which are converted into a grayscale image. The light-sensitive elements 131 of sensor layer 13 are photodiodes with a defined sensitivity for a determined spectral region of the light. In a preferred embodiment form, the sensitivity of the light-sensitive elements 131 is spectrally adapted to the emitted illumination light of the light guide layer 141 in order to increase the signal-to-noise ratio (SNR).

In a further embodiment form, the light-sensitive elements 131 of the sensor layer 13 have an electronic control unit for controlling the exposure time (not shown), e.g., as rolling shutter or global shutter, as is disclosed in US 2017/0085813 A1. This makes it possible for the exposure time and, accordingly, the integration time of the light-sensitive elements 131 to be adapted to the various brightnesses of the display 17 and ambient light (interference light 4, shown only in FIG. 8). This exposure time varies depending on the circumstances under which the apparatus according to the invention is used by the user or depending on different ambient light conditions. As a result of this electronic shutter control, it is not compulsory for the display 17 to be switched off during the recording of skin prints 21 and it is nevertheless possible to record high-contrast skin prints 21.

The recording of a skin print 21 located on the placement surface 11 is carried out according to the principle of frustrated total internal reflection (FTIR). For this purpose, illumination light with a defined angular spectrum is coupled out of the light guide layer 141. At least components of the illumination light transmit through the partially transparent display 17 and subsequently reach the placement surface 11 which is formed by the upper side of the display 17. For this purpose, the illumination light has a defined angular spectrum which leads to total internal reflection (TIR) in the transition to air after passing through all of the layers up to the placement surface 11 (at an illumination angle $\beta$; $\beta'$). This means that the user of the mobile electronic device does not perceive additional illumination light which could overwhelm the light of the luminous element layer 173 of the display 17.

A skin print 21 comprises alternating skin valleys and skin peaks. The total internal reflection at the placement surface 11 is frustrated at the overlying skin peaks because of the similar refractive index between the terminating layer 171 of display 17 and skin peaks. Components of the illumination light are scattered and coupled out into the overlying skin areas 21. There is a large difference from the terminating layer 171 to air at the skin valleys, for which reason the illumination light is reflected by total internal reflection. The illumination light reflected at the placement surface 11 is once again transmitted through the display 17, the first adhesion layer 15, the light guide layer 141 and the second adhesion layer 16 before being detected at the sensor layer 13 by the light-sensitive elements 131. Accordingly, a contrast between skin peaks and skin valleys can be determined based on the frustrated total internal reflection taking place at the skin peaks, since the detectable light intensity from the areas of the skin peak is less than that from the skin valleys. Glass, tempered glass or sapphire with a refractive index between 1.48 and 1.8 is normally used as terminating layer 171. The higher the refractive index of the terminating layer 171, the smaller the illumination angles $\beta$ (or $\beta'$, only shown in FIG. 2A) can be which undergo total reflection at the air interface (placement surface 11).

The image capture based on the principle of frustrated total internal reflection has the advantage that it uses directed illumination light which is reflected further in direction of sensor layer 13 after impinging on the placement surface 11. This allows a good resolution of the skin print 21 to be captured also across large distances or large layer thicknesses. The smaller the divergence of the light coupled out of the light guide layer 141 at illumination angle $\beta$, the better the resolution or the greater the selected distance may be between sensor layer 13 and placement surface 11 with resolution remaining the same, since a strong signal spread of the information of the skin print 21 is reduced. In order to achieve a high spatial resolution of the skin print 21 to be recorded, illumination light with a small divergence angle range of less than ±15° is used. The illumination light is limited in its divergence in horizontal direction as well as in vertical direction.

It should be mentioned that the above-defined refractive index of the adhesion layers 15 and 16 which will deviate slightly from that of the light guide layer 141 becomes less important precisely when their thickness approaches the magnitude of the utilized light wavelength. In this specific case, the above-described rules of light refraction and total reflection are to be applied to the refractive index of subsequent layers, since the light does not then sense the very thin adhesion layers 15 and 16.

The light emitted by the LED or LEDs 142 is transmitted into the light guide layer 141 at a light guiding angle $\alpha$ owing to the light guide characteristics. Because of the light out-coupling structures 144 of the light guide layer 141 which are to be described in more detail in the following, components of the light propagating in the light guide layer 141 at light guiding angle $\alpha$ are coupled out at the spatially limited light out-coupling structures 144 at a defined angle such that, after passing through all of the layers of the layer body 1 up to the placement surface 11 of the terminating layer 171 of the display 17, an illumination angle $\beta$ is adjusted for total internal reflection (TIR) at the transition to air, and the light out-coupling structures 144 permit a coupling-out of light beams with a small divergence angle range of ≤±15° in order to achieve a high spatial resolution of the skin print 21 to be recorded.

One or possibly more fingers 2, possibly also an entire hand (not shown) or a document 3, particularly ID documents (passport, driver's license, etc.) as well as credit cards, boarding passes and other personal identification documents, can be placed on the terminating layer 171 which advisably provides the placement surface 11 for the objects to be recorded. While light components are coupled out at a defined angle for the capture of skin prints 21 by the light out-coupling structures 144 provided at an interface of the light guide layer 141, the luminous element layer 173 of the display 17 can be used for the illumination of documents 3.

Figure 2A:
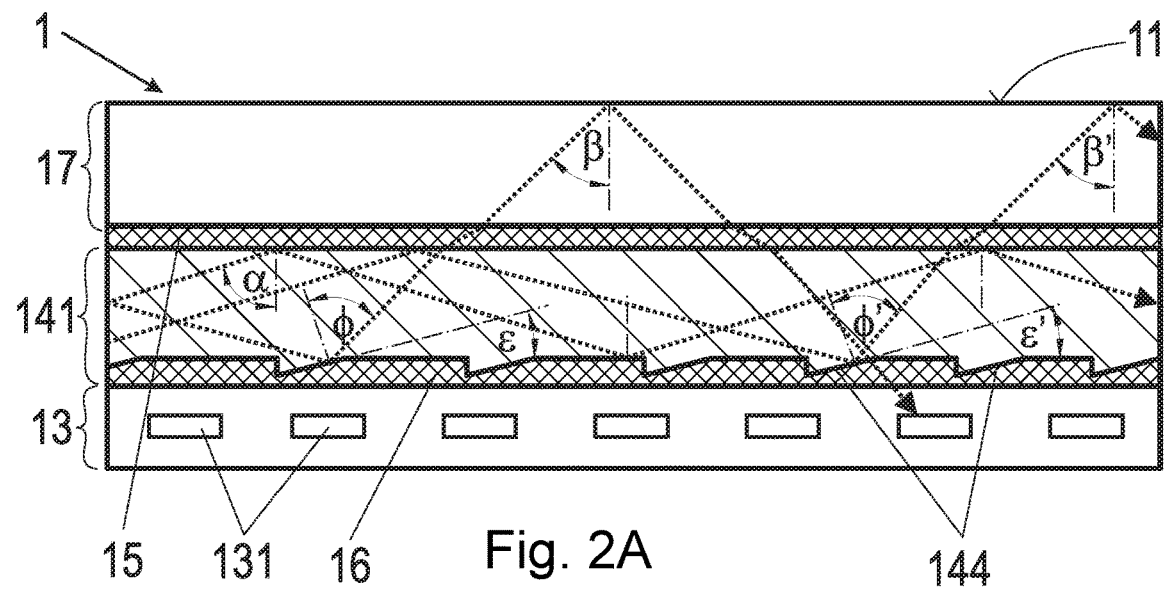
FIG. 2A shows a section of the layer body with special light out-coupling structures at the underside of the light guide layer for coupling out beams which reach the placement surface at a total reflection angle.

FIG. 2A shows an embodiment form of the layer body 1 in a side view with an enlarged view of the light guide layer 141, wherein, for example, a plurality of light out-coupling structures 144 are shown at the underside of the light guide layer 141 with an inclination angle ε. When the light guided in the light guide layer 141 at light guiding angle α impinges on a light out-coupling structure 144 at inclination angle ε, this results in a reflection angle φ relative to the perpendicular of the light out-coupling structure 144, where φ=α−ε. As a result of its angular change, the beam reflected at the light out-coupling structure 144 can now no longer undergo total reflection at the first adhesion layer 15, but rather passes through the latter and the display 17 located above it. Depending on the refractive index of the outer layers (not shown in FIG. 2A) usually in the display 17, a beam reflected at the light out-coupling structure 144 has, as the illumination light impinging on the placement surface 11, an illumination angle β by which the illumination light undergoes total reflection at the placement surface 11 (air interface) and which makes it possible to record skin prints 21 according to the principle of frustrated total internal reflection (FTIR or, for short, TIR). In this regard, the illumination angle β can be modified in a determined angular spectrum to an illumination angle β' so long as the illumination angle β' leads to a total reflection at the placement surface 11, wherein light out-coupling structures 144 with a different angle of inclination ε' are provided and beams are accordingly coupled out at a different reflection angle φ'. The possibility of using light out-coupling structures 144 with different inclination angles ε within a light source unit 14 will be discussed at greater length referring to FIGS. 7 and 8.

Figure 2B:
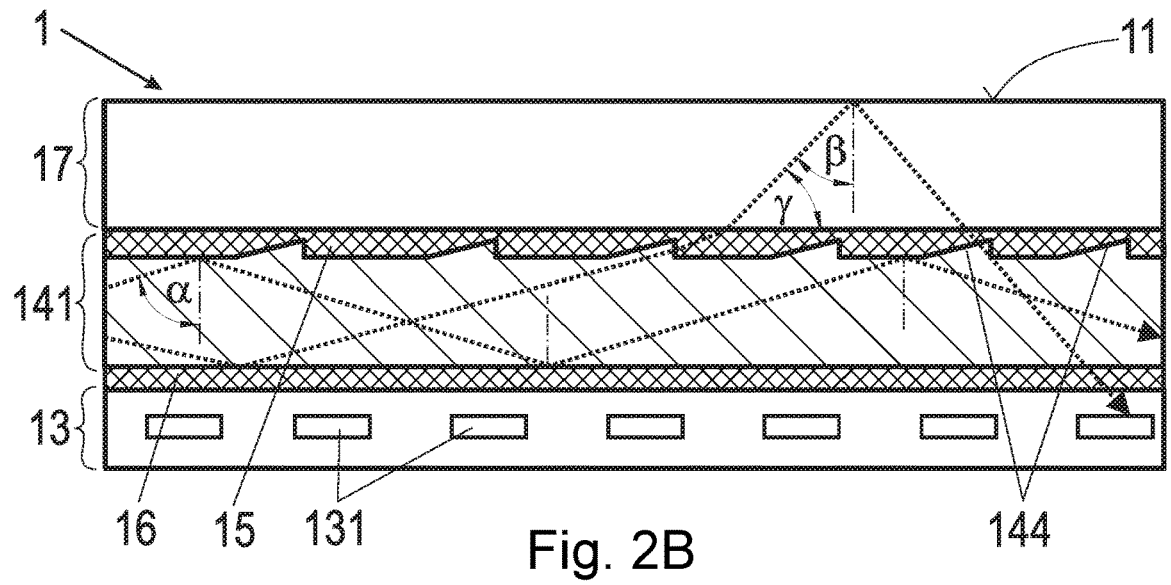
FIG. 2B shows a section of the layer body with special light out-coupling structures at the upper surface of the light guide layer for coupling out beams which reach the placement surface at a total reflection angle.

FIG. 2B shows a further embodiment form of the layer body 1 in a side view with an enlarged view of the light guide layer 141. In this example, a plurality of light out-coupling structures 144 is provided at the upper side of the light guide layer 141. The light out-coupling structures 144 are formed in such a way that, when impinging on the light out-coupling structures 144, light guided in the light guide layer 141 is coupled out of the light guide layer 141 in direction of the display 17 at a defined refraction angle γ a first time at the interface with the first adhesion layer 15 located above it and a second time at the interface with display 17. When impinging on the light out-coupling structure 144, the principal ray of the light guided in the light guide layer 141 is coupled out at light guiding angle α, including a divergence, and there is no further limiting of the divergence by the inclination angle ε of the light out-coupling structures 144. While this makes the coupling out of light more efficient with respect to the light intensity, the vertical divergence of the coupled-out beam is greater than that in FIG. 2A. The maximum possible change in angle between α and β is also lower than in FIG. 2A.

Figure 2C:
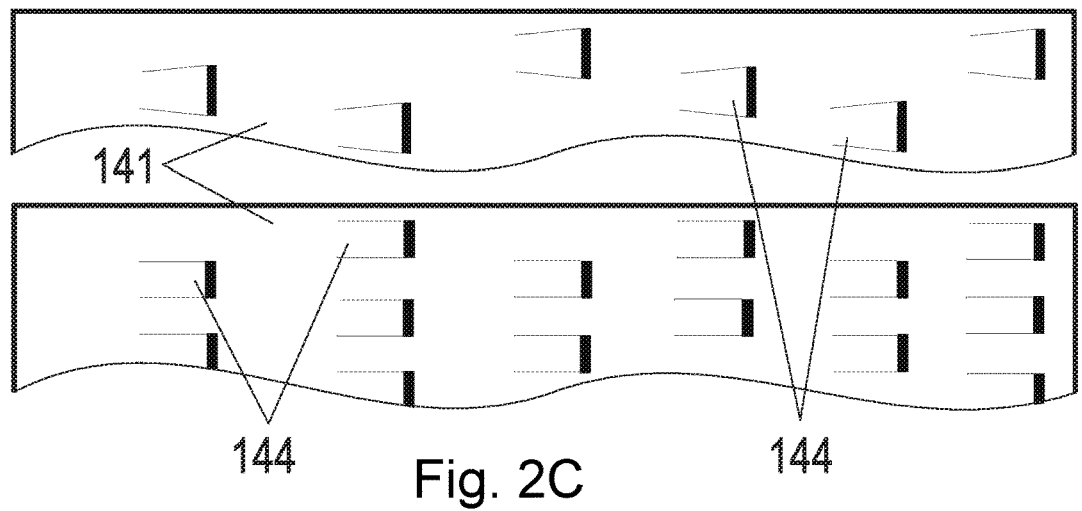
FIG. 2C shows two sections of the layer body according to the construction in FIG. 2B in a top view with wedge-shaped light out-coupling structures which show rectangles or trapezoidal surfaces ascending in a lectern-shaped manner from the direction of the LEDs.

With respect to the type and shape of the light out-coupling structures 144 in the material of the light guide layer 141, two examples for the shaping and distribution for a section of the light guide layer 141 are shown in FIG. 2C as top views to illustrate the light out-coupling structure 144 according to FIG. 2B. Apart from the rectangle shapes and trapezoid shapes shown in the figures, triangles, circle sectors or circle segments or portions of ellipses are also suitable.

Figure 3A:
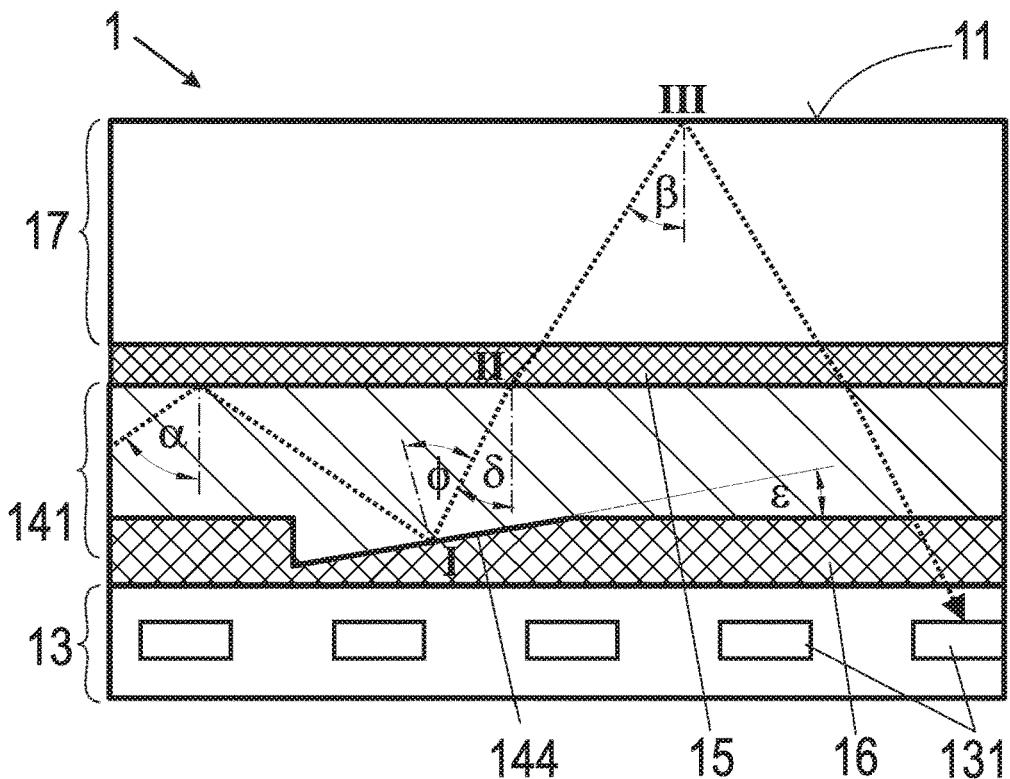
FIG. 3A a section of the layer body according to the construction in FIG. 2A with an enlarged wedge-shaped light out-coupling structure and depiction of a representative beam which is coupled out at this structure toward the placement surface of the display and reaches the placement surface at a total reflection angle.
Figure 3B:
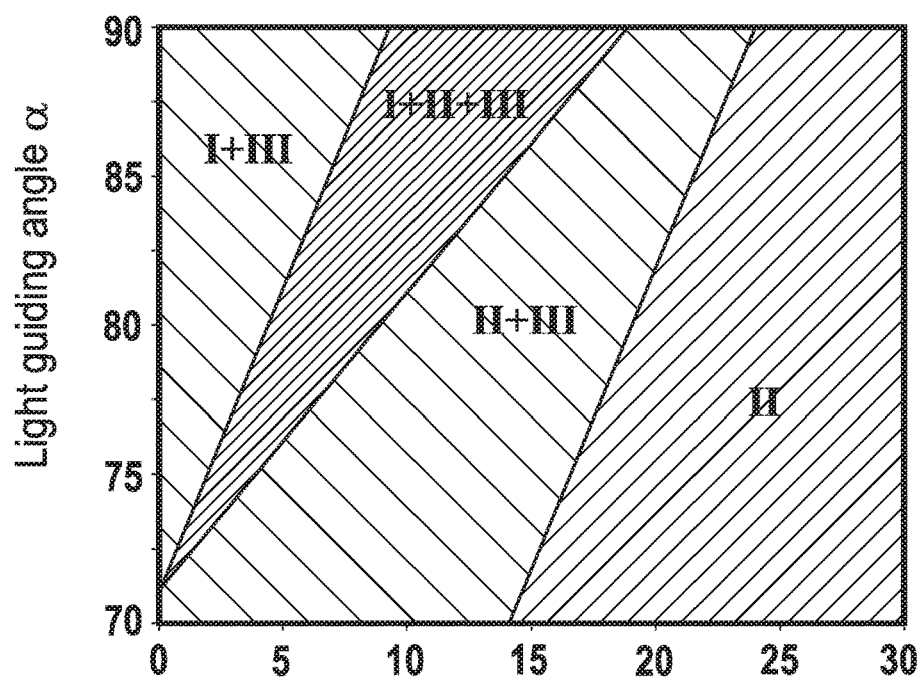
FIG. 3B a diagram based on FIG. 3A depicting the light guiding angle of the light guided in the light guide layer over the inclination angle of the wedge-shaped structure to show the dependence of the beam progression through the interfaces of the layer body due to different refraction behaviors, as state diagram.

FIG. 3A and FIG. 3B show the relationships for the embodiment form in FIG. 2A between light guiding angle α, illumination angle β, reflection angle φ, output angle δ and inclination angle ε. Preferential angles (output angle δ) at which illumination light is coupled out of the light guide layer 141 are defined depending on the difference in the refractive index between light guide layer 141 and the adjoining adhesion layers 15 and 16. In this respect, a schematic beam path for light out-coupling structures 144 at the underside of light guide layer 141 is shown in a side view in FIG. 3A, wherein the light guide layer 141 has a refractive index of n=1.49 and the adjoining adhesion layers 15 and 16 have a refractive index of n=1.41, for example.

FIG. 3B further contains the three conditions (designated by Roman numerals I, II, III) that must be met in order to ensure proper operation of the apparatus:

I: Guided rays (α>71°) must undergo total reflection at the light out-coupling structure 144:

$$\varphi > \sin^{-1}\frac{1.41}{1.49} = 71° | \varphi = \alpha - \varepsilon$$

II: The ray which is deflected through the light out-coupling structure 144 and which impinges at the upper surface of the light guide layer 141 at output angle δ=α−2·ε may not undergo total reflection there:

$$\delta < \sin^{-1}\frac{1.41}{1.49} < 71°$$

III: Total reflection must take place at the cover layer/air interface of the terminating layer of display 17 (assuming n=1.49 for terminating layer 17)

$$\delta > \sin^{-1}\frac{1.00}{1.49} = 42°$$

The diagram in FIG. 3B shows the combinations of light guiding angle α of the light guided in the light guide layer 141 and inclination angle ε of the light out-coupling structures 144 which are allowed for the numerical example mentioned above and which contribute (I+II+III) to the imaging according to the invention during the recording of a skin print 21. For an inclination angel c of light out-coupling structures 144 of ε~10, most of the rays which are coupled out originally had a light guiding angle of α=85°±5°. Accordingly, an angle spectrum β~δ=65°±5° results for the display 17 with refractive index similar to that of light guide layer 141 (n~1.5). The uniform coupling out of light on the entire surface of the light guide layer 141 and a correspondingly homogeneous illumination of a skin print 21 lying on the placement surface 11 is realized through the adaptation of a fill factor of the light out-coupling structures 144.

In the embodiment form with light out-coupling structures 144 such as is shown in FIG. 2A, the vertical divergence of the coupled-out illumination light can be adjusted very precisely compared with the embodiment form in FIG. 2B via the inclination angle ε of the light out-coupling structures 144 and the difference in the refractive index between the light guide layer 141 and the adjacent adhesion layers 15, 16. Depending on the case of application, the apparatus according to the invention can be optimized more in the direction of light intensity or in the direction of a narrow angle spectrum of the illumination light. High-quality skin prints 21 with a high resolution are obtained in that the light coupled out of the light guide layer 141 has a very small divergence, i.e., the coupled-out angle spectrum is small.

Figure 4:
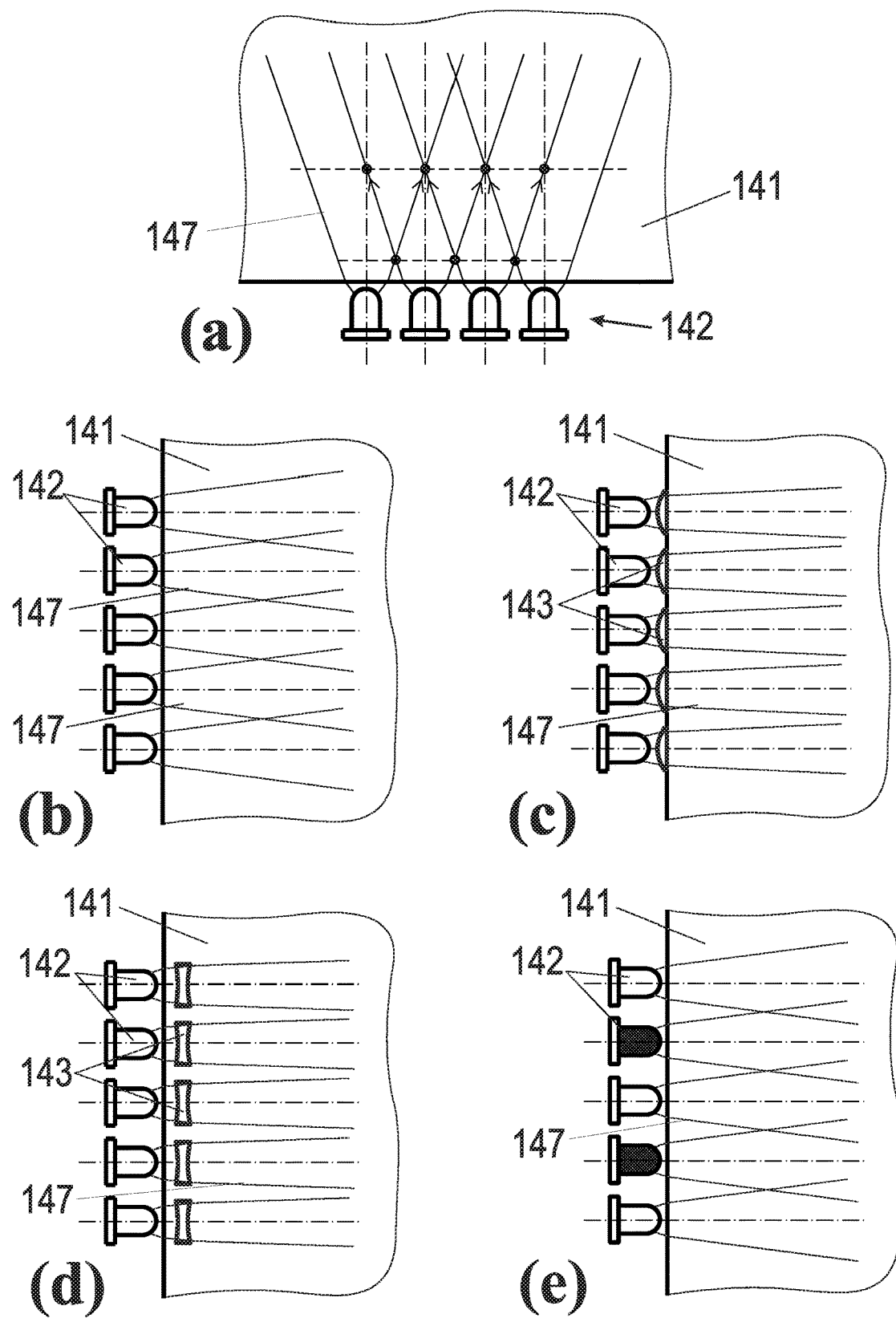
FIG. 4 several advantageous embodiment forms for the coupling of light into the light guide layer of the apparatus according to the invention in which, at a narrow side of the light guide layer, (a) uncollimated LEDs are coupled in, wherein every object point generates a plurality of image points, (b) LEDs which are precollimated by the manufacturer irradiate directly, (c) LEDs with intermediate precollimation optics couple in, (d) LEDs irradiate via precollimation optics embedded in the light guide layer, and (e) LEDs of different wavelengths are alternately arranged for alterative spectral illumination.

Various ways of coupling in illumination light at a narrow side of the light guide layer 141 by means of a plurality of LEDs 142 and light bundles thereof which are emitted with varying degrees of divergence are shown in FIG. 4 in five top views which differ with respect to the state of precollimation. It is assumed for these constructional variants that most of the LEDs 142 have already been precollimated in varying degrees by the manufacturer.

Portion (a) of FIG. 4 shows the coupling in of illumination light at a narrow side of the light guide layer 141 by means of a plurality of LEDs 142 and the clearly divergent beams 147 thereof in a top view.

Various embodiment forms can be used as source for the illumination light. If a plurality of LEDs 142 is used without collimation of the beams 147, the individual beams 147 overlap and, as a result, an illuminated object point of a finger 2 placed on the placement surface 11 is illuminated by different beams 147 and imaged (so as to be distributed) on a plurality of image points of the scanned image recording or on a plurality of light-sensitive elements 131 of the sensor layer 13 (not shown here). The mapping of an object point on a plurality of image points is indicated by way of example in portion (a) of FIG. 4 by the arrows.

As an inevitable result of the mixing of the beams 147 of the plurality of light-emitting LEDs 142, a plurality of image points is generated in the sensor layer 13 from an object point at the placement surface 11 so that the same object information of an overlying finger 2, for example, is detected on a plurality of light-sensitive elements 131, and the resolution of the imaged skin print 21 decreases. The smaller the horizontal and vertical divergence of the beams 147, the higher the resolution.

Portion (a) of FIG. 4 schematically shows in a top view how an object point (shown in each instance as a black dot along the bottom dashed line) is imaged respectively on two image points (as spaced-apart points on the second dashed line) at a distance from one another. This happens because there is a distance between placement surface 11 and sensor layer 13 as a result of the relatively thick display 17 and the light guide layer 141. The shorter this distance is, the smaller the spread of the object information and the better the resolution. The smaller the divergence of the beam 147, the better the resolution and the greater the thickness of the display 17 that can be selected with the same resolution. Therefore, means for collimating the beams 147 of the LEDs 142, as are shown in further portions of FIG. 4, are a way to improve the resolution or increase the thickness of display 17.

In portion (b), LEDs 142 which are precollimated by the manufacturer are used and—as described above—they are arranged so as to be tightly packed relative to one another and at the shortest distance from the narrow side of the light guide layer 141 into which light is to be coupled. Accordingly, a reasonable divergence of the beams 147 can be realized without additional precollimation optics 143 with a good mixing of the light components of the individual LEDs 142. Further, light refraction comes about at the interface between air and the narrow side of the light guide layer 141 when the illumination light is coupled in, and a certain precollimation is achieved in this way.

In case this type of coupling in does not suit the requirements for the spatial resolution of the image recording, the constructional variants with additional precollimation optics 143 according to portions (c) and (d) of FIG. 4 are preferred. In portion (c), refractive convex lenses formed integral with the narrow side of the light guide layer 141 are selected as precollimation optics 143, for which GRIN lenses can also substitute. In portion (d), the refractive precollimation optics 143 are incorporated into the material of the light guide layer 141 as concave lenses and are formed from an optically thinner medium, i.e., with an appreciably lower refractive index than the light guide layer 141. A gaseous medium such as air, for example, is best suited to this purpose. While the collimation state which can be achieved with embodiment examples according to portions (c) and (d) ensures the best possible resolution, it has the disadvantage of an uneven intensity distribution of illumination of the placement surface 11 so that it is necessary to weigh these two configurations and the variant according to portion (b) against one another to determine which requirements should be given priority. The following considerations referring to FIGS. 5A and 5B are also to be taken into account.

In portion (e) of FIG. 4, the tightly packed LEDs 142 have different spectral emission wavelengths and are alternately arranged along the narrow side of the light guide layer 141 and are switchable. At least two different spectral regions are selected in order to record alternately illuminated images of the overlying objects, skin prints 21 or documents 3 which are preferably used for verifying authenticity.

Figure 5A:
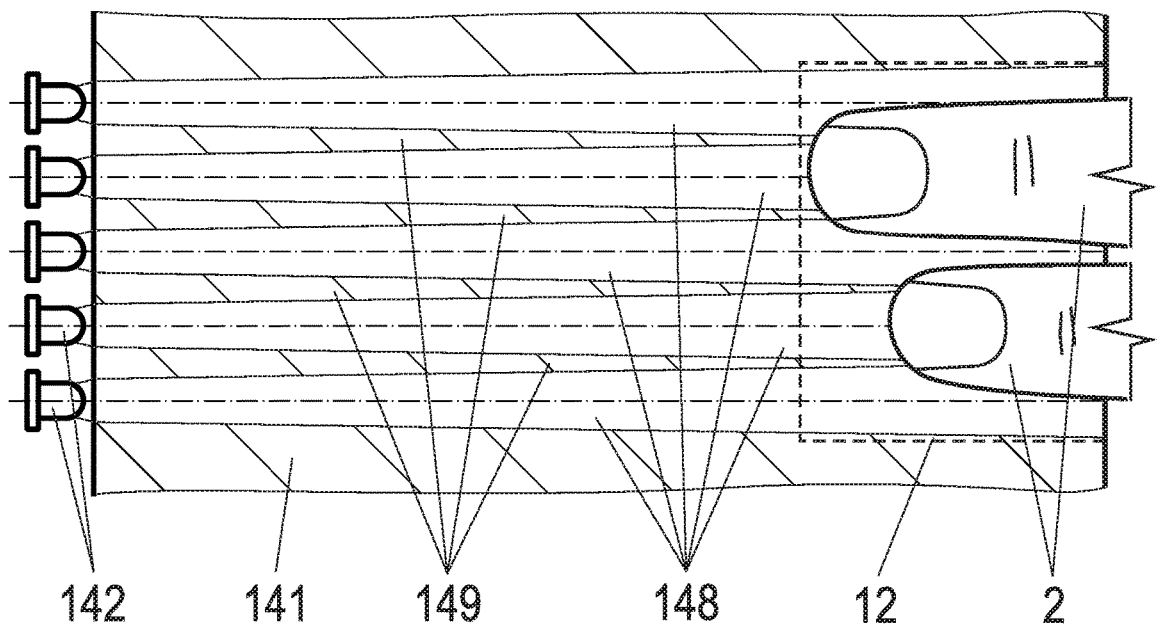
FIG. 5A a preferred embodiment form of the invention for recording high-resolution skin prints in a top view of the layer body, wherein the light out-coupling structures of the light guide layer are formed such that only illumination light of a beam of a light out-coupling structure for illumination of skin prints impinges at each point of the placement surface.
Figure 5B:
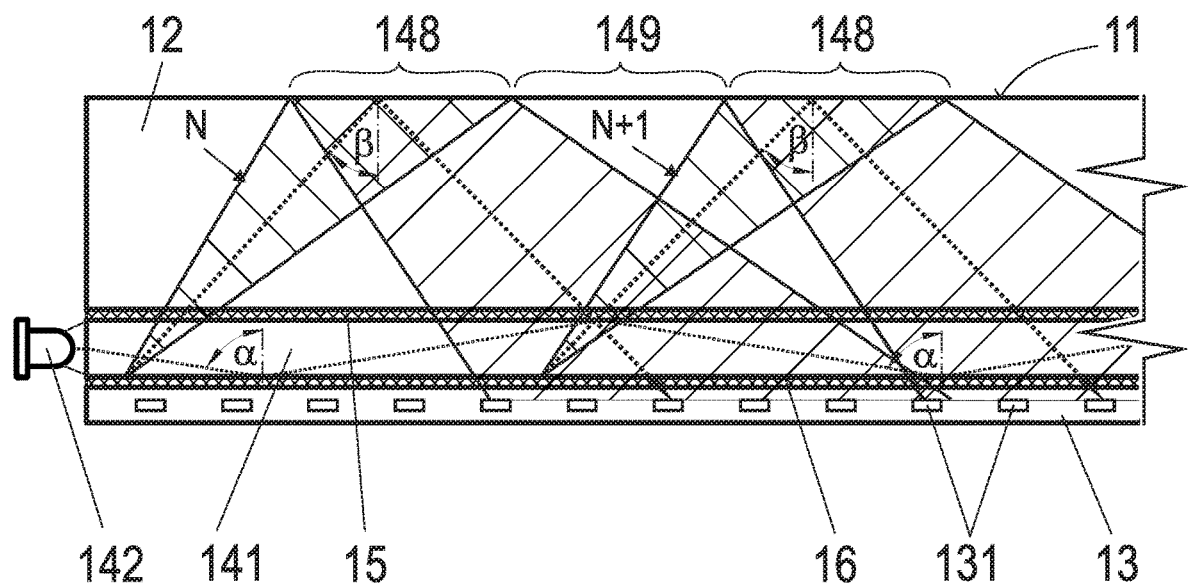
FIG. 5B a preferred embodiment form of the invention for recording high-resolution skin prints in a side view of the embodiment form according to FIG. 5A.

FIG. 5A and FIG. 5B show a preferred construction of the apparatus according to the invention for recording high-resolution skin prints 21. In this instance, the light out-coupling structures 144 of the light guide layer 141 are formed such that maximum illumination light of a discrete beam 147 of a light out-coupling structure 144 impinges at every point of the placement surface 11 for illumination of skin prints 21; that is, beams 147 from more than one light out-coupling structure 144 do not impinge or overlap on any point on the placement surface 11.

In a particularly advantageous embodiment form, the light out-coupling structures 144 of the light guide layer 141 are formed such that the illumination light at illumination angles β which are coupled out of the light guide layer 141 undergoes total internal reflection at the interface between terminating layer 171 of display 17 and air and is reflected back in direction of sensor layer 13 and, after passing through the partially transparent display 17, the first adhesion layer 15, the light guide layer 141 and the second adhesion layer 16, impinges on the light-sensitive elements 131 of the sensor layer 13 such that the expanded beams 147 of the individual light out-coupling structures 144 also do not overlap in the sensor layer 13. An improved resolution of the overlying skin print 21 is realized in this way because the image points of various object points lying on the placement surface 11 imaged on the sensor layer 13 do not overlap, i.e., every light-sensitive element 131 of the sensor layer 13 detects the totally internally reflected illumination light of a point on the placement surface 11 to the maximum degree.

Accordingly, high-resolution recordings of skin prints 21 are possible in spite of a large distance between placement surface 11 and sensor layer 13 because there is no signal mixing. This specific type of illumination must be realized in irradiation direction (FIG. 5B) as well as perpendicular to the irradiation direction (FIG. 5A).

In order to prevent an overlapping of the signal perpendicular to the irradiation direction, it is advantageous when the illumination in this direction has a small angular spectrum as is shown in FIG. 5A. As has already been described, this is realized by means of corresponding LEDs 142 and with precollimation optics 143 (as described referring to FIG. 4). In a specific construction, the illumination light of the plurality of LEDs 142 is highly precollimated so that the beams 147 thereof do not overlap over the entire placement surface 11. While the resolution of a skin print 21 to be recorded is accordingly high, intermediate regions 149 also arise in which no illumination light impinges on the placement surface 11. No information on an object (finger 2) positioned on the placement surface 11 can be recorded in the intermediate regions 149. On the other hand, a high-resolution skin print 21 is detected from the readout regions 148 through the sensor layer 13.

Depending on the thickness of the layer body 1 and on the distance between placement surface 11 and sensor layer 13, an overlapping of the consecutively coupled-out beams N and N+1 (reflected at the placement surface 11) can be prevented in the plane of the light-sensitive elements 131, as is shown in FIG. 5B, by means of suitable arrangement of the LEDs 142 and the light out-coupling structures 144 (horizontal and vertical divergence, fill factor and angle of inclination ε of the light out-coupling structures 144).

There are two possible ways of dimensioning the embodiment form described above. In a first variant, the spacing of the readout regions 148 is small compared with the structure of the skin print 21 to be detected such that a complete image can be recorded with low resolution on the entire placement surface 11.

In a second variant, the spacing of the readout regions 148 is large compared with the structure of the skin print 21 to be detected so that the readout regions 148 can then be detected with very good resolution through the light-sensitive elements 131 of the sensor layer 13 because there is no information overlap. In this regard, a detection of security features of the third order is also possible (resolution of skin pores). In this variant, no skin regions 21 are resolved (detected) in the intermediate regions 149. Accordingly, on the whole, an image with high resolution but with gaps is obtained. Both variants are very easily usable for applications with 1:1 comparison, e.g., for authentication.

It is possible to use an illumination variant shown in FIG. 5A for mobile applications with mobile electronic devices, wherein a virtually gapless region for capturing high-quality skin prints 21 is present on the side opposite the illumination in-coupling through the LEDs 142, this region serving as eligible authentication region 12, e.g., for use as home button for unlocking smartphones or for relevant applications for high security such as logging into a bank account, confirming payments, and so forth. While the region for low-security-relevant applications which can be configured on the opposite side (near illumination in-coupling through the LEDs 142) has intermediate regions 149 with detection gaps, it can also be used to capture skin prints 21 and employed, for example, in instances of application such as games, app control and the like. In this case, the information of recorded skin prints 21 supplies valuable further information because, in addition to the position of one or more overlying fingers 2, the differentiation between the plurality of fingers 2 and the orientation thereof (orientation on the placement surface 11), rotation (left edge and right edge of finger) and angle (flat placement or fingertip) can be evaluated. This additional information can be effectively used for a more intuitive and simpler app control.

Figure 6:
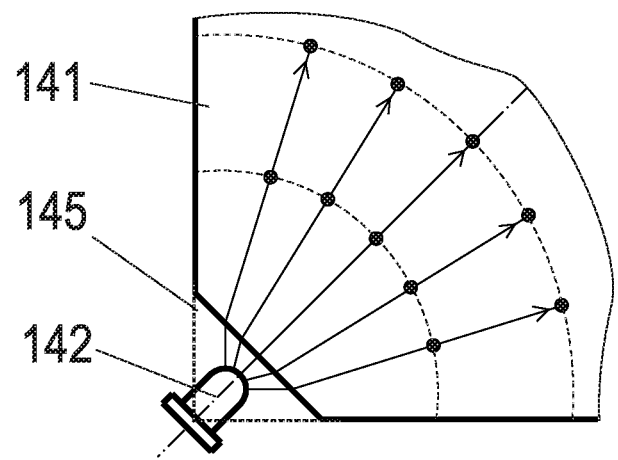
FIG. 6 several advantageous embodiment forms of the coupling of light into the light guide layer of the apparatus according to the invention in which, at a cut corner of the light guide layer, a corner illumination is realized (a) with an uncollimated LED, wherein every object point (in horizontal direction) generates exactly one image point, (b) two LEDs with diffuser arranged therebetween and (c) with an uncollimated LED, wherein the cut corner of the light guide layer has an in-coupling surface which is curved in an adapted manner.
Figure 6:
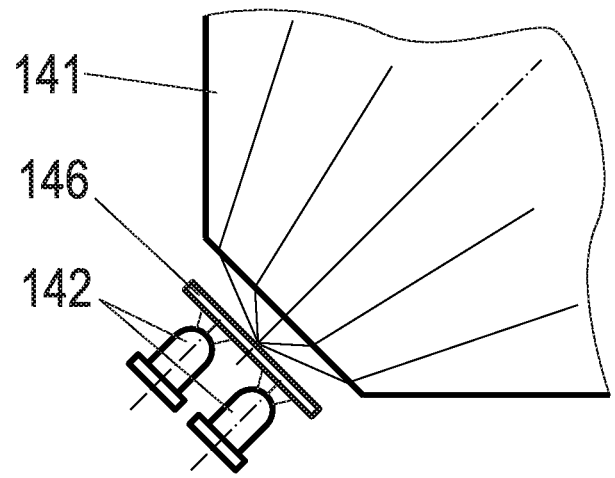
Figure 6:
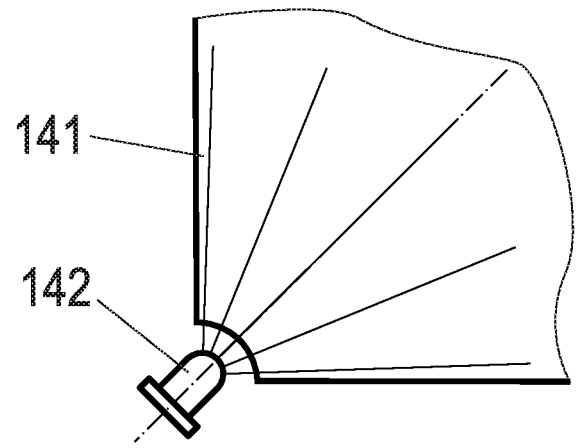

FIG. 6 shows three top views of further construction details of the apparatus according to the invention with a so-called corner light coupling-in with at least one LED 142.

FIG. 6 contains a portion (a) which shows an embodiment form for coupling the light of an LED 142 into the light guide layer 141 in a top view in which the coupling in of light is implemented at least at one corner of the light guide layer 141 by cutting this corner. The cut corner 145 generates an additional narrow side of the light guide layer 141 having an angle of 135° with the narrow sides typically present in a rectangular light guide layer 141. This embodiment form has the advantage that no collimation of the beam 147 of LED 142 coupled into the light guide layer 141 is necessary in horizontal direction by precollimation optics 143 (as is shown in FIG. 4). LED 142 should preferably emit into the light guide layer 141 at an angle of ±45° to the adjacent right-angled narrow sides. In so doing, every object point generates only one discrete image point in horizontal direction as is shown by the black dots in portion (a) because there is no overlapping of different beams 147. A reduction in resolution takes place only through the vertical divergence (not shown) which, however, as already described above, can be sharply limited owing to the small differences in refractive index between light guide layer 141 and adjacent adhesion layers 15 and 16 and the inclination angle ε of the light out-coupling structures 144, and it is even possible to limit to divergences of less than ±5°. The drop in intensity of the divergent beam 147 coupled into the light guide layer 141 can be compensated by an increasing fill factor from size and density of the light-out coupling structures 144 toward the edge.

With a corner illumination constituted in this way, reflections at the edge areas of the adjacent narrow sides of the light guide layer 141 can be disadvantageous because they can result in double images and in impaired resolution. Therefore, a preferred construction consists in that the light guide layer 141 has absorbent coatings at the further narrow sides at which no light is coupled in, which absorbent coatings absorb or couple out light impinging thereon.

Further measures in addition to those in portion (a) are shown in portions (b) and (c) of FIG. 6. In portion (b), the light distribution or light homogenization of (at least) two LEDs 142 is improved by a diffuser 146 through which light is uniformly emitted in all directions, while, in portion (c), the cut corner 145 is constructed as a concave curve so that all of the rays exiting divergently from the LEDs 142 can enter the light guide layer 141 without discontinuity so that illumination light exiting from only one LED 142 can propagate in the entire light guide layer 141.

Figure 7:
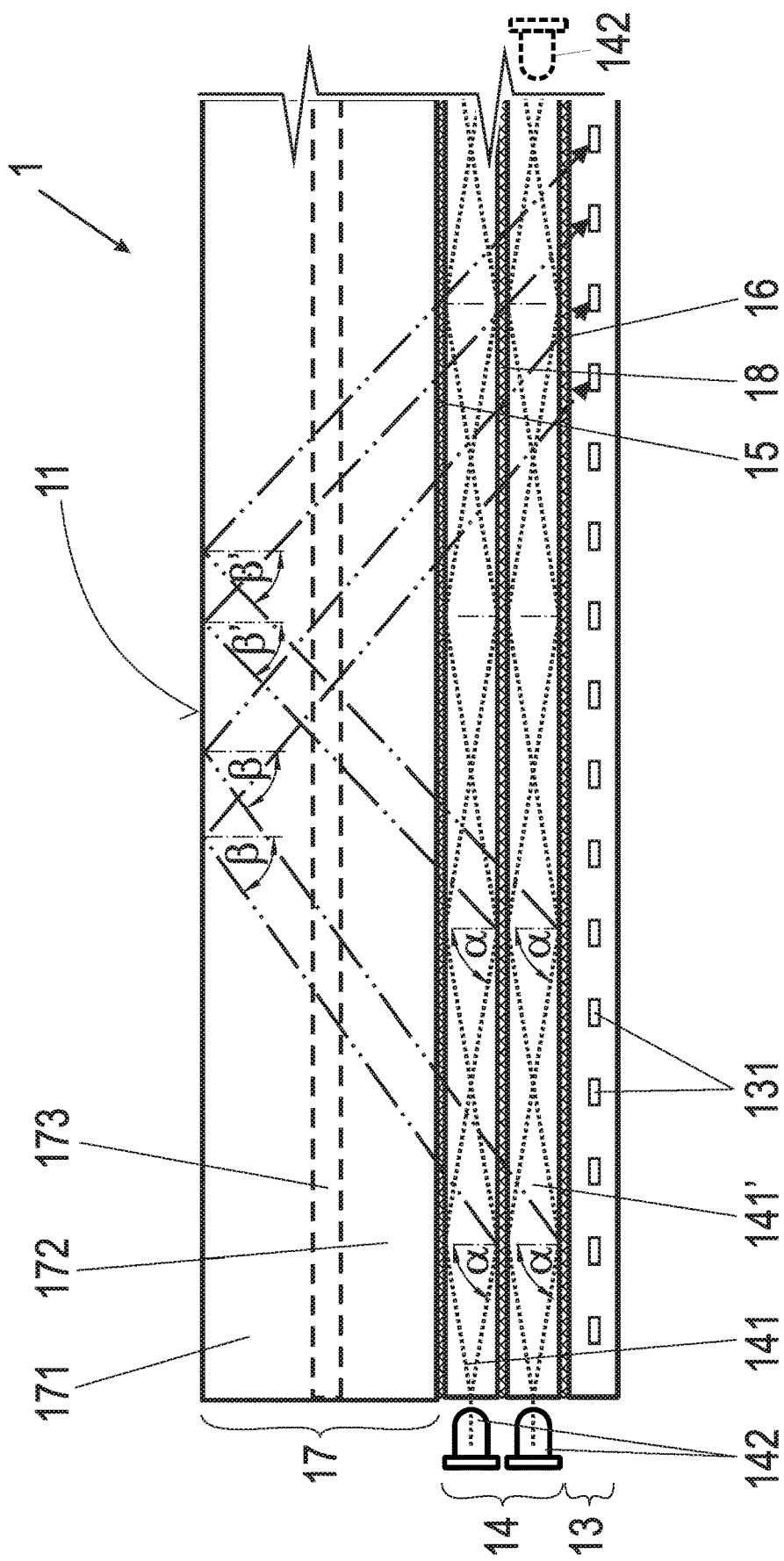
FIG. 7 a special embodiment form of the apparatus according to the invention in which two light guide layers are provided directly one above the other above the sensor layer and below a display arranged above the two light guide layers.

FIG. 7 shows an advisable construction of the apparatus according to the invention which, in contrast to FIG. 1, has two light guide layers 141, 141' adjacent to one another. The further light guide layer 141' offers a number of advantages. Due to the high transparency of light guides, a plurality of light guide layers 141, 141' can be arranged selectively one above the other and connected to one another through a low-refracting adhesive. A further adhesion layer 18 formed in this way should have the same refractive index as the second adhesion layer 16 between light guide layer 141 and sensor layer 13.

There are various possibilities for supplying light to the light guide layers 141 and 141'.

First, there is the variant shown in FIG. 7 in which the light guide layers 141, 141' are provided with LEDs 142 from the same narrow side of the layer body 1. As a first advantage, there is an increased intensity of the coupled-out light because both light guide layers 141, 141' are highly transparent, and the further light guide layer 141' does not effectively perceive the light guide layer 141 lying above it. Further, the light beams which are coupled out parallel to one another are offset relative to one another viewed from the top and contribute to the homogenization of the illumination in that each light guide layer 141 illuminates only a certain portion of the placement surface 11 in each instance so that larger placement surfaces 11, for example, for recording entire hand surfaces or a plurality of hands, can also be illuminated very well.

The second advantage consists in that a plurality of recordings can be made consecutively with illumination exclusively by one of the identical light guide layers 141, 141', etc., the images can be compared, and the best image can be selected. Apart from measures for live detection, this is important for capturing dry and moist skin prints 21. Illumination light with different wavelengths (e.g., UV, IR) in addition to VIS spectral regions can be used in the further light guide layer 141' for live detection.

A third advantage results when the light out-coupling structures 144 of the two light guide layers 141, 141' have different inclination angles ε, ε' (shown in detail only in FIG. 2A), and light guide layer 141 or further light guide layer 141' causes, for example, an illumination angle β' which, while also suitable for TIR, deviates from the illumination angle β of light guide layer 141 and accordingly also generates a comparison image of the skin print 21 which can contribute to better results particularly for different skin types (dry and moist skin). The first light guide layer 141 can be selectively switched on or off for this illumination mode.

In a variant modified from FIG. 7, the light of the LEDs 142 can be introduced at different, preferably opposite, narrow sides of the layer body 1 for each of the light guide layers 141 and 141'. This variant is depicted symbolically as elective optional alternative by the LEDs 142 shown in dashes on the right-hand narrow side of the further light guide layer 141'.

In this alternative case, the rays coupled out of the light guide layers 141 and 141' result in two different images with a spatial offset which can be subtracted out, and the two fingerprint images can be compared with one another for purposes of improving quality, and the better image can be selected, or both images can be fused by subsequent image processing.

Figure 8:
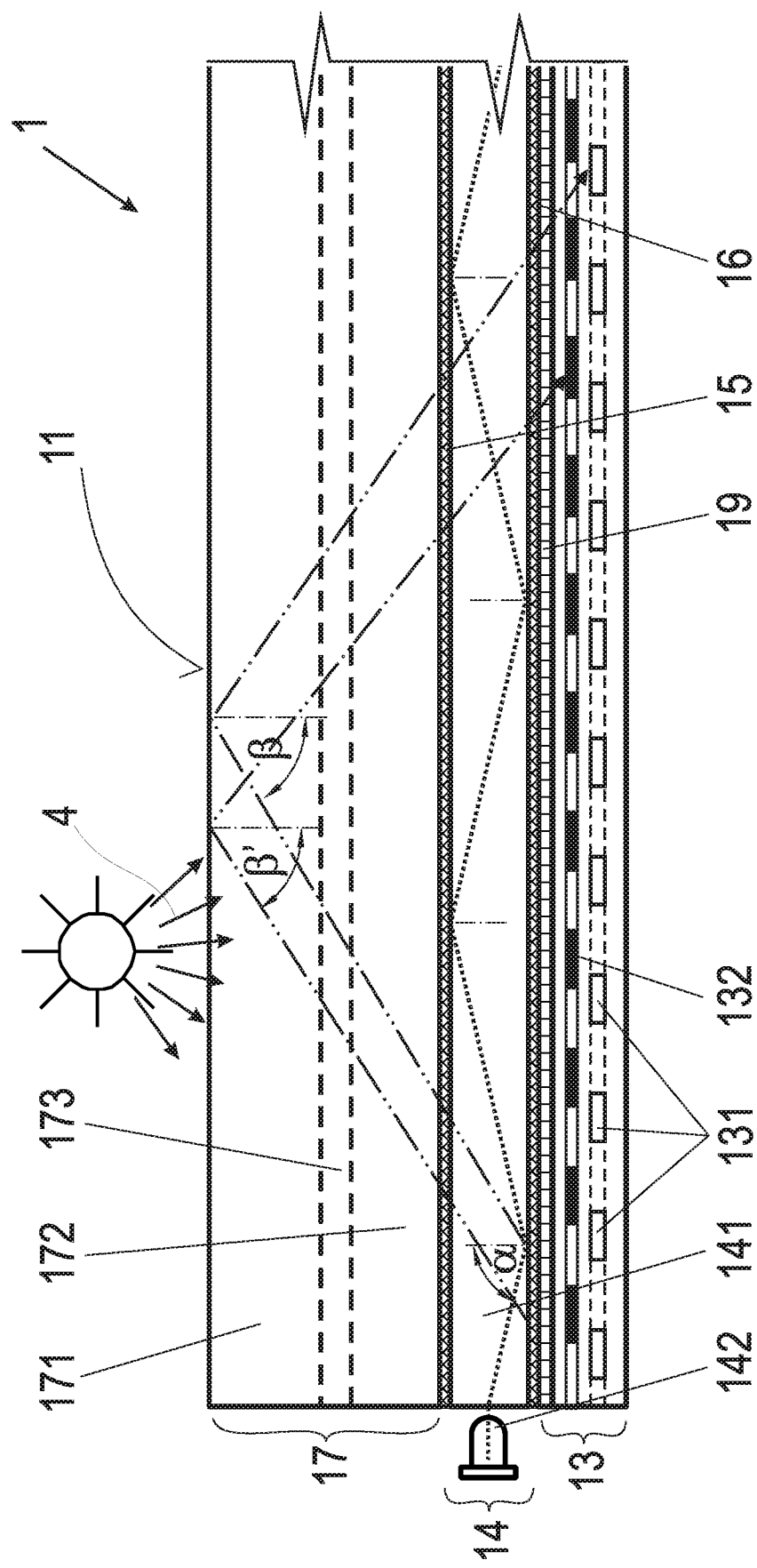
FIG. 8 a particularly advantageous embodiment form of the invention in which an additional diaphragm layer for reducing the light incidence of a plurality of source locations on one and the same light sensitive element of the sensor layer and a spectral filter layer for suppressing interference light are provided above the sensor elements.

FIG. 8 shows a preferred embodiment of the invention which is expanded over FIG. 1. In this case, a filter layer—shown here by way of example as full-surface spectral filter layer 19—is added above the sensor layer 13 and can additionally eliminate ambient light especially. However, the spectral filter layer 19 can also be mounted (not shown) on the separate light-sensitive elements 131. In a preferred embodiment form, the spectral filter layer 19 is a narrow-band filter and is adapted to the wavelength of the illumination light of light guide layer 141 so that it is transparent to most of the illumination light and has an absorbent effect for residual light components, for example, for the light components of the luminous element layer 173 of display 17 and other interference light 4.

In comparison with FIG. 1 and FIG. 7, there is the further characteristic that the sensor layer 13 comprises an additional diaphragm layer 132 which allows exclusively the beams 147 selectively coupled out of the light guide layer 141 at defined illumination angles β to impinge on the light-sensitive elements 131 after total reflection at the placement surface 11. All other angles are discriminated (reflected or absorbed) by the diaphragm layer 132. The diaphragm layer 132 and the spectral filter layer 19 can also be added in the embodiments according to FIG. 1 and FIG. 7 if desirable.

The influence of horizontal and vertical divergence of the illumination light is mitigated by the diaphragm layer 132, and thicker terminating layers 171 can subsequently be used for displays 17 while retaining the same resolution, for example, in order to improve protection and/or stability of the layer body 1 and of the entire apparatus.

Non-transparent diaphragm materials are necessary for effective blocking of interference light 4 or of totally reflected light from illumination angles β' which are not to be detected. Materials which are used in photolithography coating processes owing to their ability to be easily structured, for example, metals such as chromium, aluminum, gold, molybdenum, copper, silver or silicon, are preferred for the individual diaphragms in the diaphragm layer 132. However, owing to the reflective characteristics of these materials, unwanted reflections can result at the upper surfaces of the diaphragms, which have a limiting effect on the contrast of the image recording, increase noise or generate double images. Therefore, absorbent organic materials, e.g., polytetrafluoroethylene, and absorbent inorganic materials such as diamond-like carbon films, black chromium, copper indium disulfide or materials with specific microstructures are preferably used. Materials which can be applied as structured diaphragm layer 132 over the light-sensitive elements 131 of the sensor layer 13 by printing methods, e.g., screen printing, are particularly preferred because they can be produced quickly, flexibly and inexpensively. Chiefly organic materials are used for this purpose in printing methods.

Figure 9:
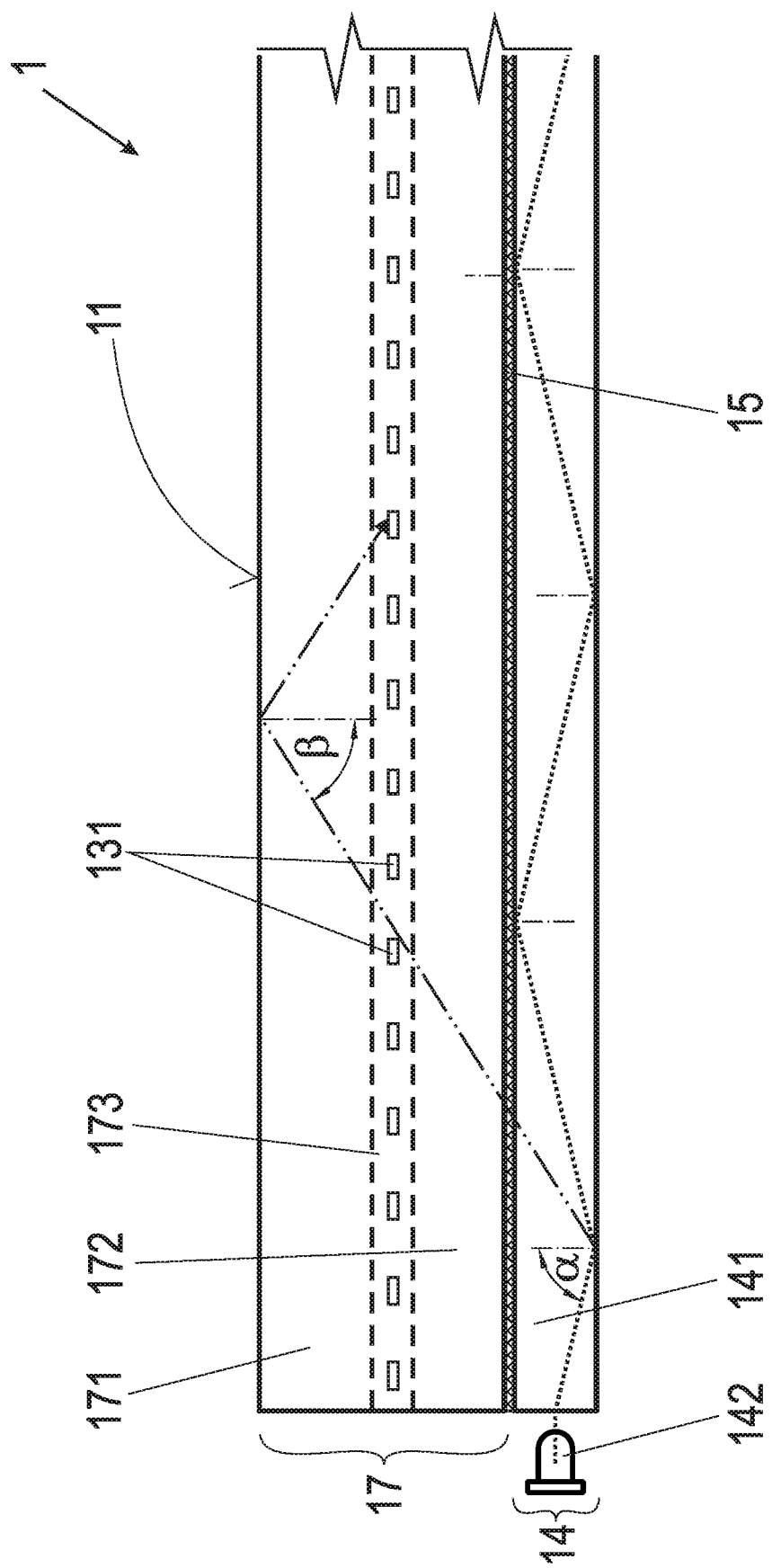
FIG. 9 a particular embodiment form of the apparatus according to the invention in which the light-sensitive elements are directly embedded in the display layer.

FIG. 9 shows a further advantageous construction of the invention which is differs from the preceding figures by the combination of display 17 and light-sensitive elements 131. The construction is made more compact by implementing the light-sensitive elements 131 in the usual luminous element layer 173 of the display 17 and now only comprises the light guide layer 141 located under the modified display 17. The additional layers such as spectral filter layer 19 and diaphragm layer 132 can also be similarly integrated in the display 17 for this construction.

High-resolution, high-contrast recordings of skin prints 21, and also of documents, by means of a mobile electronic device based on a selective coupling out of light from a light guide layer 141 at defined angles for total internal reflection (TIR) are possible with the embodiment forms of the invention described herein. Further, diaphragm structures which allow exclusively the TIR angle ranges coupled out of the light guide layer 141 in a defined manner to be detected are associated with the individual light-sensitive elements 131 as diaphragm layer 133 in the sensor layer 13. Further optimization of image recordings of skin prints 21 and security-relevant documents 3 can be achieved by additional measures of sensor control for adjusting electronic shutter functions (rolling shutter or global shutter).

REFERENCE CHARACTERS 1 layer body
11 placement surface
12 authentication region (home button)
13 sensor layer
131 light-sensitive elements
132 diaphragm layer
14 light source unit
141 light guide layer
141' (further) light guide layer
142 LED
143 precollimation optics
144 light out-coupling structure
145 (cut) corner
146 diffuser
147 beam (coupled into the light guide layer 141)
148 readout region
149 intermediate region
15 first adhesion layer
16 second adhesion layer 17 display
171 terminating layer
172 substrate
173 luminous element layer
18 further adhesion layer
19 spectral filter layer (bandpass)
2 finger
21 skin print (to be recorded)
3 document
4 interference light
α light guiding angle (of the light guided in light guide layer 141, 141')
β, β' illumination angle (at the placement surface 11)
δ output angle (from the light guide layer 141)
ε, ε' inclination angle (of the light out-coupling structure 144)
φ, φ' reflection angle (of the light out-coupling structure 144)
γ refraction angle (of the light out-coupling structure 144)

What is claimed is:

1. An apparatus for direct optical recording of a skin print, the apparatus comprising:
a layer body comprising a placement surface formed by a terminating layer of the layer body, and a combination of a display and a sensor layer, the sensor layer having light-sensitive elements arranged in a sensor grid;
a light source unit arranged below the display, the light source unit being formed as a light guide layer and having an LED light in-coupling at a narrow side of the light guide layer;
the light guide layer having light out-coupling structures, the light out-coupling structures permitting directed coupling out of light from the light guide layer at a defined angle in a direction of a terminating layer based on an inclination angle c of the light out-coupling structures and on differences of refractive indices between neighboring layers of the light guide layer, wherein total internal reflection (TIR) of the light at an air interface of the placement surface has a divergence angle range of ≤±15° after the light passes through all of the layers up to the terminating layer to achieve a high spatial resolution of the skin print to be recorded, the display having a defined transparency of at least 1% of the light guide layer in a direction of the placement surface; and
a first adhesion layer disposed between the display and the light guide layer, and a sec-ond adhesion layer disposed between the light guide layer and the sensor layer;
wherein the first adhesion layer and the second adhesion layer have a refractive index of the same magnitude being at least from 1% to 30% lower than refractive indices of the light guide layer, the display and the sensor layer, the refractive indices of the light guide layer, the display and the sensor layer being between 1.45 and 2.0.

2. The apparatus according to claim 1, further comprising a precollimation optics being arranged downstream of an LED of the LED light in-coupling and serving to adjust a horizontal divergence in a beam coupled horizontally into the light guide layer between 2.5° and 30° in order to achieve an improved resolution of the skin print to be recorded.

3. The apparatus according to claim 2, wherein the precollimation optics is a refractive optical element.

4. The apparatus according to claim 2, wherein the precollimation optics associated with the LED is a lens incorporated at the narrow side of the light guide layer.

5. The apparatus according to claim 4, the precollimation optics associated with the LED is formed inside the light guide layer as a concave lens of a medium with a lower refractive index than that of the light guide layer.

6. The apparatus according to claim 4, wherein the precollimation optics associated with the LED is a convex lens or GRIN lens at the narrow side of the light guide layer.

7. The apparatus according to claim 2, further comprising a plurality of adjacent LEDs and the precollimation optics is arranged along the narrow side of the light guide layer in such a way that the beams of the LEDs overlap neither in a horizontal direction nor in a vertical direction to form readout regions on the placement surface in which high-resolution skin prints can be recorded, and further intermediate regions in which there is no information about skin prints.

8. The apparatus according to claim 7, wherein the placement surface further comprises an authentication region having a density of the readout regions greater than 50% of an area of the authentication region and being configured for virtually gapless recording of a high-resolution skin print for authentication applications.

9. The apparatus according to claim 7, wherein the placement surface further comprises a region having an intermittent arrangement of readout regions with a percentage of intermediate regions being greater than 50% of area of said regions and being configured for recording the skin print with intermittent high-resolution capture in spatial vertical and horizontal direction for low security applications and the capture of finger gestures.

10. The apparatus according to claim 1, wherein the LED light in-coupling further comprises a cut corner of the light guide layer for corner coupling-in of the light with at least one LED at a narrow side of the light guide layer, so that a drop in intensity of a divergent beam coupled into the light guide layer is compensated by an increasing fill factor of the light out-coupling structures.

11. The apparatus according to claim 10, further comprising a diffuser arranged between the at least one LED and the light guide layer for uniformly distributing the coupled-in light in all solid angles of the light guide layer so that there is no decrease in light at the edge regions of the light guide layer adjoining the cut corner.

12. The apparatus according to claim 1, further comprising a further light guide layer arranged under the light guide layer being transparent, the further light guide layer being connected to the light guide layer by a further adhesion layer having a refractive index which is selected as low as the refractive indices that of the first adhesion layer and of the second adhesion layer.

13. The apparatus according to claim 12, wherein the light guide layer and the further light guide layer have a light in-coupling on opposite narrow sides of the layer body.

14. The apparatus according to claim 12, wherein the further light guide layer couples out in a direction of the placement surface in the same manner as the light guide layer.

15. The apparatus according to claim 12, wherein the light guide layer and the further light guide layer have the light out-coupling structures in regions of the light guide layer and of the further light guide layer that are horizontally offset relative to one another.

16. The apparatus according to claim 1, wherein the light-sensitive elements being arranged in a defined grid and incorporated in a luminous element layer inside the display are provided in a partially transparent display.

17. A method for direct optical recording of a skin print using an apparatus according to claim 12, the method comprising:
- increasing a relative proportion of directed illumination light of the light guide layer relative to an undirected light emission of the display by switching off the display during the recording at least in a region of the skin prints placed;
- recording a first image with the sensor layer with illumination by the light guide layer and storing it in an image storage as a stored first image;
- analyzing the first image and determining whether defined quality criteria are met,
- recording a second image with the sensor layer with illumination by the further light guide layer when the defined quality criteria are not met in the first image; and
- analyzing the second image and determining whether the defined quality criteria are met;
- wherein when the defined quality criteria are met in the second image, the first image in the image storage is replaced with the second image; or when the defined quality criteria are not met in the second image, the stored first image is superposed on the second image with a defined known offset, and a high-resolution fused image is stored.

18. The method for direct optical recording of a skin print and a document using an apparatus according to claim 12, the method comprising:
- increasing a proportion of directed illumination light of the light guide layer relative to an undirected light emission of the display by switching off the display during the recording of a first image at least in a region of a skin print placed for recording;
- recording the first image with the sensor layer by illumination at an illumination angle $\beta$ suitable for causing TIR in a terminating layer of the display with the light guide layer coupling out at a diffraction angle $\gamma$, and storing the first image in an image storage as image of the placed skin print; and
- recording a second image with the sensor layer by illumination with the display for recording the document, and storing the second image as image of the placed document.

* * * * *